(12) United States Patent
Baros et al.

(10) Patent No.: US 12,122,483 B2
(45) Date of Patent: Oct. 22, 2024

(54) ACTUATOR

(71) Applicant: Marine Canada Acquisition Inc., Richmond (CA)

(72) Inventors: Davor Baros, Vancouver (CA); Tan Howard Rambo, Vancouver (CA); Lucas Damien Garel, Vancouver (CA); Michael Brent Ure, Delta (CA)

(73) Assignee: Dometic Marine Canada Inc., Richmond (CA)

( * ) Notice: Subject to any disclaimer, the term of this patent is extended or adjusted under 35 U.S.C. 154(b) by 543 days.

(21) Appl. No.: 17/509,715

(22) Filed: Oct. 25, 2021

(65) Prior Publication Data

US 2022/0041251 A1 Feb. 10, 2022

Related U.S. Application Data

(63) Continuation-in-part of application No. 16/590,363, filed on Oct. 1, 2019, now Pat. No. 11,155,322.
(60) Provisional application No. 62/739,836, filed on Oct. 1, 2018.

(51) Int. Cl.
*B63B 1/32* (2006.01)
*F16H 25/20* (2006.01)

(52) U.S. Cl.
CPC ............ *B63B 1/32* (2013.01); *F16H 25/20* (2013.01); *F16H 2025/2031* (2013.01); *F16H 2025/2075* (2013.01)

(58) Field of Classification Search
CPC ........ B63B 1/32; B63B 39/061; H02K 5/132; H02K 7/06; H02K 7/08; H02K 7/116; H02K 2205/09; B63J 3/00; B63J 2003/005; B63J 2003/002; F16H 25/20

USPC ..................................................... 74/89.23
See application file for complete search history.

(56) References Cited

U.S. PATENT DOCUMENTS

| | | | |
|---|---|---|---|
| 2,357,465 A | 9/1944 | Focht |
| 2,640,665 A | 6/1953 | Gibb |
| 2,679,367 A | 5/1954 | Pribil et al. |
| 3,062,167 A | 11/1962 | Bennett |
| 3,577,948 A | 5/1971 | Frey |
| 3,601,078 A | 8/1971 | Bedford, Jr. |
| 3,628,484 A | 12/1971 | Banner |
| 3,650,310 A | 3/1972 | Childress |

(Continued)

FOREIGN PATENT DOCUMENTS

DE 102007037484 A1 2/2009
EP 0921068 A2 6/1999

(Continued)

OTHER PUBLICATIONS

International Search Report & Written Opinion mailed Jan. 14, 2020 from related International Application No. PCT/CA2019/051408.

*Primary Examiner* — Anthony D Wiest
(74) *Attorney, Agent, or Firm* — CALDERON SAFRAN & WRIGHT P.C.

(57) ABSTRACT

An actuator includes a drive body including a torque-transfer surface configured to receive a torque. The actuator further includes: a drivable body including an output shaft such that rotation of the drive body causes movement of the output shaft; a first bearing configured to transfer thrust forces from the output shaft in a first direction; and a second bearing configured to transfer thrust forces from the output shaft in a second direction. At least the first bearing extends in a radial dimension beyond the torque-transfer surface.

20 Claims, 13 Drawing Sheets

(56) References Cited

U.S. PATENT DOCUMENTS

| | | |
|---|---|---|
| 3,695,204 A | 10/1972 | Bennett |
| 3,760,758 A | 9/1973 | Banner |
| 3,769,927 A | 11/1973 | Carney |
| 3,783,817 A | 1/1974 | Banner |
| D235,635 S | 7/1975 | Curtis |
| 3,955,527 A | 5/1976 | Holtermann |
| 4,261,278 A | 4/1981 | Gaudin |
| 4,355,985 A | 10/1982 | Borst et al. |
| 4,420,741 A | 12/1983 | West |
| 4,742,794 A | 5/1988 | Hagstrom |
| 4,759,732 A | 7/1988 | Atsumi |
| 4,854,259 A | 8/1989 | Cluett |
| 4,908,766 A | 3/1990 | Takeuchi |
| 5,474,013 A | 12/1995 | Wittmaier |
| 5,491,372 A | 2/1996 | Erhart |
| 5,524,567 A | 6/1996 | Astley et al. |
| 5,557,154 A | 9/1996 | Erhart |
| 5,881,666 A | 3/1999 | Crews, Jr. |
| 6,085,684 A | 7/2000 | Cotton |
| 6,089,177 A | 7/2000 | Mueller |
| 6,113,443 A | 9/2000 | Eichinger |
| 6,167,830 B1 | 1/2001 | Pilger |
| 6,644,081 B1 | 11/2003 | Berry |
| 6,756,707 B2 | 6/2004 | Hochhalter et al. |
| 6,923,136 B1 | 8/2005 | D Alessandro |
| 7,143,711 B1 | 12/2006 | Wolske |
| 7,188,581 B1 | 3/2007 | Davis et al. |
| 7,311,058 B1 | 12/2007 | Brooks et al. |
| 7,467,596 B2 | 12/2008 | Salmon |
| 7,631,610 B1 | 12/2009 | Wolske |
| 8,043,053 B2 | 10/2011 | Bernhard |
| 8,251,006 B2 | 8/2012 | Kalil |
| 8,256,710 B2 | 9/2012 | Mason et al. |
| 8,261,682 B1 | 9/2012 | Devito |
| 8,387,551 B2 | 3/2013 | Mueller |
| 8,453,530 B2 | 6/2013 | Duits et al. |
| 8,707,884 B2 | 4/2014 | Snow |
| 8,960,031 B2 | 2/2015 | Keech et al. |
| 9,415,837 B2 | 8/2016 | Wendels |
| 9,520,756 B2 | 12/2016 | Fedosovsky et al. |
| 9,683,643 B2 | 6/2017 | Cyren et al. |
| 11,155,322 B2 | 10/2021 | Baros |
| 2002/0109427 A1 | 8/2002 | Hochhalter et al. |
| 2002/0174818 A1 | 11/2002 | Von Wolske |
| 2009/0165694 A1 | 7/2009 | Beamer |
| 2009/0277369 A1 | 11/2009 | Gai et al. |
| 2010/0186654 A1 | 7/2010 | Buzzi |
| 2014/0026800 A1 | 1/2014 | Mueller |
| 2014/0190387 A1 | 7/2014 | Snow |
| 2014/0318432 A1 | 10/2014 | Wendels |
| 2015/0263587 A1 | 9/2015 | Fedosovsky et al. |

FOREIGN PATENT DOCUMENTS

| | | |
|---|---|---|
| EP | 2250077 B1 | 2/2018 |
| JP | 2003049921 A | 2/2003 |

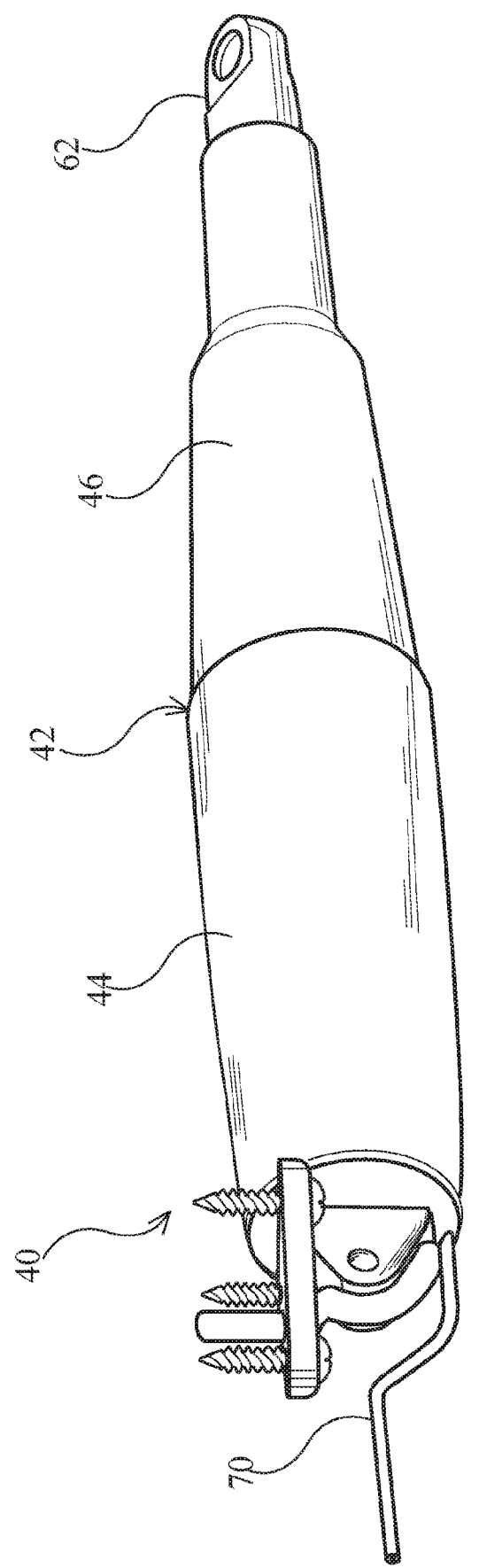

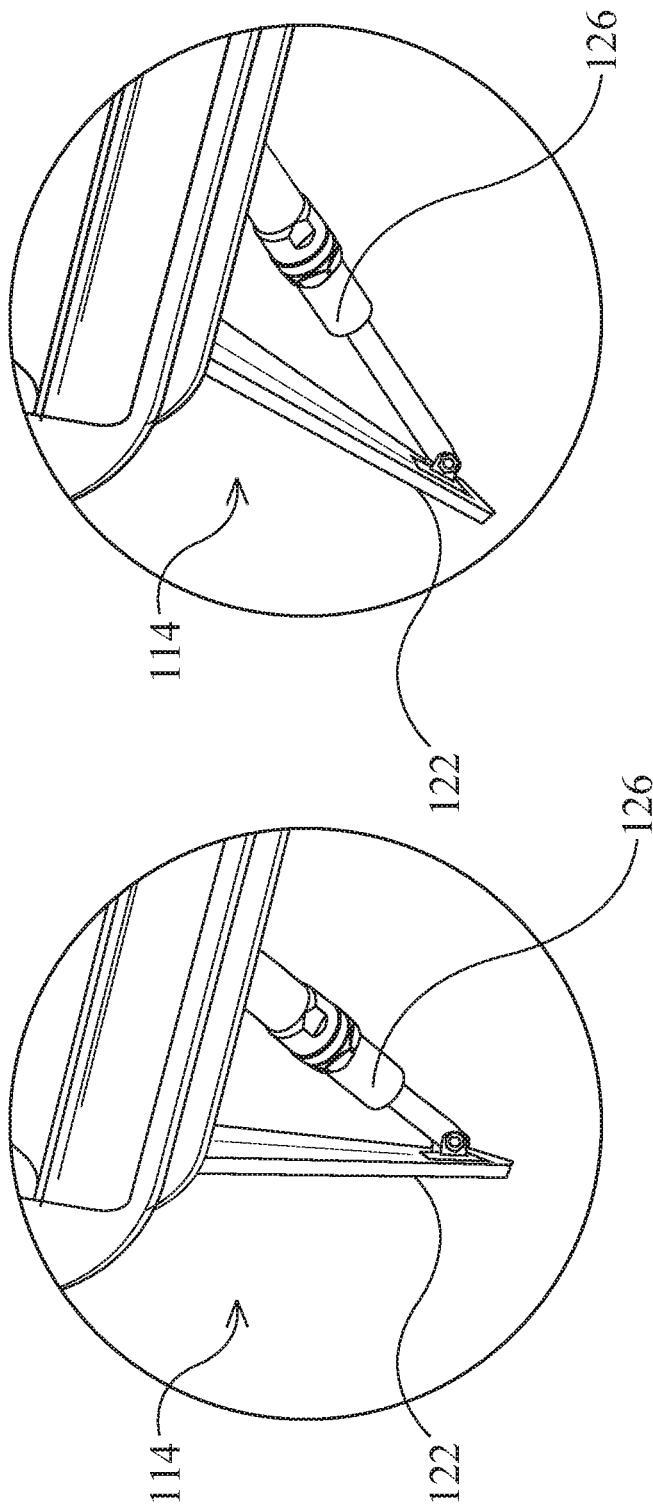

ACTUATOR

CROSS-REFERENCE TO RELATED APPLICATIONS

This application is a continuation-in-part of U.S. patent application Ser. No. 16/590,363 filed Oct. 1, 2019, which claims the benefit of U.S. provisional patent application No. 62/739,836 filed Oct. 1, 2018, the disclosures of which are incorporated herein by reference.

FIELD

The present disclosure relates to actuators.

RELATED ART

U.S. Pat. No. 5,881,666 which issued on Mar. 16, 1999, in the name of Crews discloses a trim tab actuator. There is a ram adapted to be connected at a first end to the trim tab and connected at a second end to a drive. The ram has a longitudinal portion equal to at least the maximum stroke of the ram and is received in the longitudinal bore of which longitudinal bore has a length equal to or greater than the maximum stroke of the ram. An inboard seal is disposed between the ram and bore. The inboard seal is positioned inboard of the longitudinal portion of the ram when the ram is retracted.

SUMMARY

Embodiments of the present disclosure may include a watertight electric actuator for use as part of a trim tab assembly or wake gate assembly.

According to one embodiment, there is provided an actuator comprising a housing and a drive tube assembly disposed within the housing. The drive tube assembly includes a drive tube provided with internal threads, a piston nut provided with external threads which threadedly engage the internal threads of the drive tube, and an output shaft connected to the piston nut. A motor rotates the drive tube to cause the piston nut to reciprocate along a length of the drive tube and the output shaft to reciprocate relative to the housing. There are bearings which transmit axial loads from the drive tube to the housing and transmit radial loads from the drive tube to the housing.

The piston nut may be threadedly connected to the output shaft. A diameter of the external threads of the piston nut may be larger in diameter than threads that threadedly connect the piston nut to the output shaft. There may be a planetary gear reduction coupling the motor to the drive tube. There may be a vent tube allowing fluid communication between the atmosphere and an interior of the housing. The actuator may be watertight. The actuator may be part of a trim tab assembly or a wake gate assembly.

According to another embodiment, there is provided an actuator comprising a housing and a drive shaft assembly disposed within the housing. The drive shaft assembly includes a drive shaft provided with external threads, a piston nut provided with internal threads which threadedly engage the external threads of the drive shaft, and an output shaft connected to the piston nut. A motor rotates the drive shaft to cause the piston nut to reciprocate along a length of the drive shaft and the output shaft to reciprocate relative to the housing. There are bearings which transmit axial loads from the drive shaft to the housing and transmit radial loads from the drive shaft to the housing.

The piston nut may be threadedly connected to the output shaft. A diameter of the internal threads of the piston nut may be larger in diameter than threads that threadedly connect the piston nut to the output shaft. There may be a planetary gear reduction coupling the motor to the drive shaft. There may be a vent tube allowing fluid communication between the atmosphere and an interior of the housing. The actuator may be watertight. The actuator may be part of a trim tab assembly or a wake gate assembly.

According to at least one embodiment, there is provided an actuator comprising: a housing; and a drive body rotatably coupled to the housing such that the drive body is rotatable relative to the housing around a drive-body axis of rotation. The drive body comprises: a threaded surface; a first thrust-transfer surface extending transversely to the drive-body axis of rotation and facing a first direction along the drive-body axis of rotation; a second thrust-transfer surface extending transversely to the drive-body axis of rotation and facing a second direction, opposite the first direction, along the drive-body axis of rotation; and a torque-transfer surface configured to receive a torque around the drive-body axis of rotation to rotate the drive body relative to the housing and around the drive-body axis of rotation. The actuator further comprises: a drivable body comprising an output shaft and a threaded surface, the threaded surface of the drivable body threadedly engaged with the threaded surface of the drive body such that rotation of the drive body relative to the housing and around the drive-body axis of rotation causes movement of the output shaft relative to the housing and along the drive-body axis of rotation; a first bearing facing the first thrust-transfer surface and configured to transfer, to the housing, thrust forces from the output shaft in the first direction; and a second bearing facing the second thrust-transfer surface and configured to transfer, to the housing, thrust forces from the output shaft in the second direction. At least the first bearing extends, in a radial dimension from the drive-body axis of rotation, beyond the torque-transfer surface.

In some embodiments, the second bearing extends, in the radial dimension from the drive-body axis of rotation, beyond the torque-transfer surface.

In some embodiments, the drive body is a drive tube, the threaded surface of the drive body is on an interior side of the drive tube, and the threaded surface of the drivable body is on an exterior side of the drivable body.

In some embodiments, the first and second thrust-transfer surfaces are at opposite ends of the drive tube.

In some embodiments, the drivable body comprises a piston nut coupled to the output shaft, the piston nut having the threaded surface of the drivable body.

In some embodiments, the drive body is a drive shaft, the threaded surface of the drive body is on an exterior side of the drive shaft, and the threaded surface of the drivable body is on an exterior side of the drivable body.

In some embodiments, a portion of the housing contacts the output shaft and supports the output shaft radially relative to the drive-body axis of rotation beyond the drive body in a direction along the drive-body axis of rotation and towards a distal end of the output shaft that is positionable outside of the housing.

In some embodiments, the actuator further comprises a motor comprising a motor shaft rotatable relative to the housing around a motor-shaft axis of rotation, wherein the motor is configured to apply a torque directly to the motor shaft and around the motor-shaft axis of rotation, and the motor shaft is coupled to the torque-transfer surface such that rotation of the motor shaft relative to the housing and around the motor-shaft axis of rotation causes rotation of the drive body relative to the housing and around the drive-body axis of rotation.

In some embodiments, the motor-shaft axis of rotation is colinear with a line within the first and second bearings.

In some embodiments, the drive-body axis of rotation and the motor-shaft axis of rotation are coaxial.

In some embodiments, the drive body further comprises a thrust-transfer body comprising the first and second thrust-transfer surfaces, and the threaded surface of the drive body is entirely on a first side of the thrust-transfer body.

In some embodiments, the drive body further comprises a threaded shaft having the threaded surface of the drivable body, and the thrust-transfer body is threaddedly coupled to the threaded shaft.

In some embodiments, the drive body further comprises a thrust-transfer body comprising the first and second thrust-transfer surfaces, the motor is on a first side of the thrust-transfer body, and the threaded surface of the drive body is entirely on a second side of the thrust-transfer body opposite the first side of the thrust-transfer body.

In some embodiments, the actuator further comprises at least one gear coupling the motor shaft to the torque-transfer surface.

In some embodiments, at least the first bearing extends, in the radial dimension from the drive-body axis of rotation, beyond the motor and beyond the at least one gear.

In some embodiments, the first bearing is an axial-only bearing, and the second bearing is an axial-only bearing.

In some embodiments, the actuator is devoid of bearing surfaces that are radially opposed relative to the drive-body axis of rotation, that contact any rolling elements of the actuator, and that are positioned to support, directly, the drive body or the drivable body.

In some embodiments, the first and second thrust-transfer surfaces face away from each other.

According to at least one embodiment, there is provided a marine vessel comprising: a transom; a tab hingedly mounted to the transom; and the actuator mounted to the transom and to the tab such that actuation of the actuator actuates the tab between retracted and deployed positions relative to the transom.

In some embodiments, the tab is part of a trim tab assembly or a wake gate assembly.

BRIEF DESCRIPTION OF THE DRAWINGS

The disclosure will be more readily understood from the following description of the embodiments thereof given, by way of example only, with reference to the accompanying drawings, in which:

FIG. 5 is a perspective view of an actuator employed to retract and deploy the port trim tab as shown in FIGS. 3 and 4;

FIG. 9 is an enlarged view of a port wake gate assembly of the marine vessel of FIG. 8 shown in a retracted configuration;

FIG. 10 is an enlarged view of the port wake gate assembly of the marine vessel of FIG. 8 shown in a deployed configuration;

DETAILED DESCRIPTION

Figure 1:
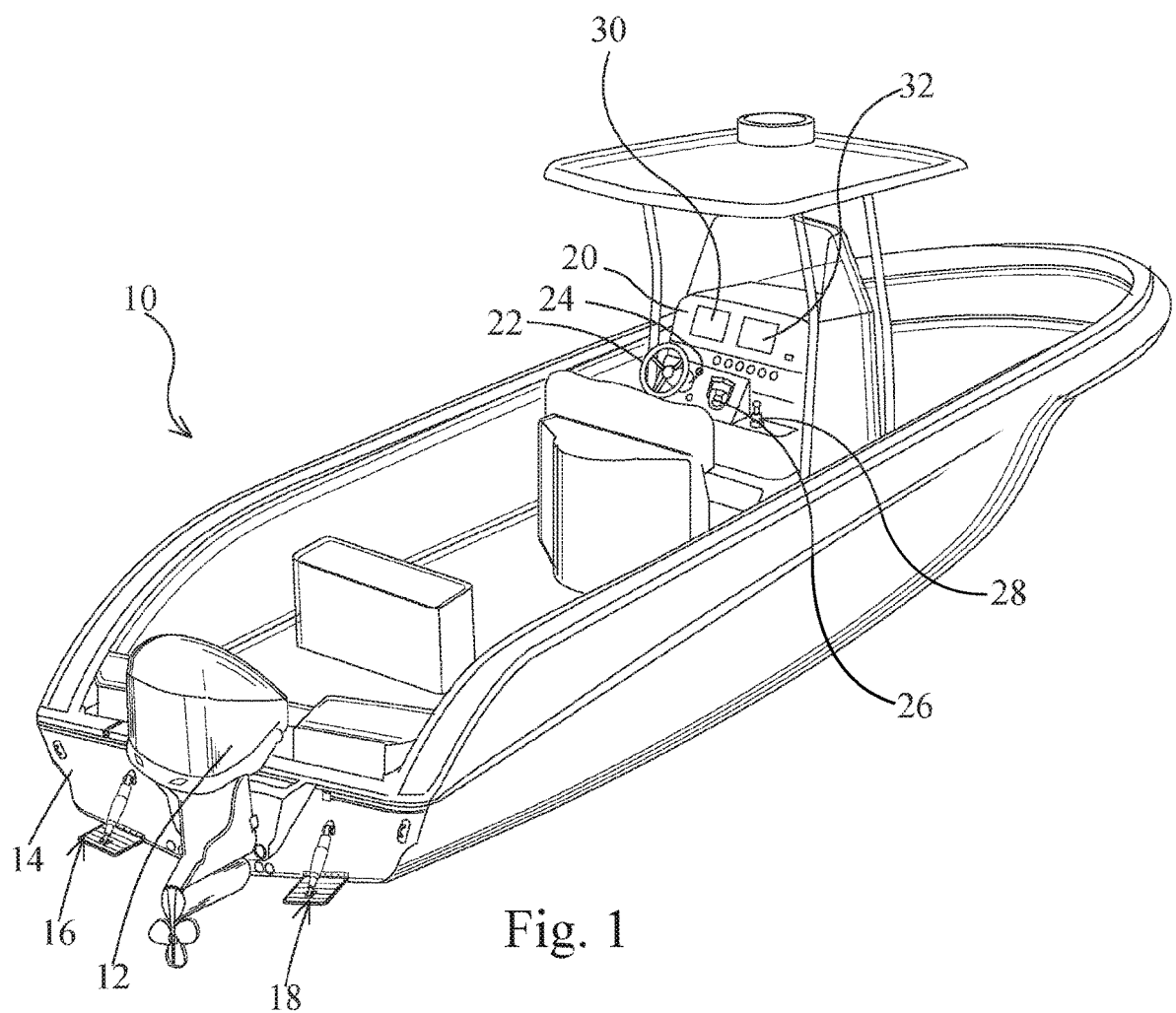
FIG. 1 is a perspective view of a marine vessel provided with trim tab assemblies according to one embodiment.

Referring to the drawings and first to FIG. 1, there is shown a marine vessel 10 according to one embodiment and which is provided with a propulsion unit which, in this example, is in the form of an outboard engine 12 mounted on a transom 14 of the marine vessel 10. However, the marine vessel 10 may be provided with any number or form of propulsion units in other examples. The marine vessel 10 is also provided with a port trim tab assembly 16 and a starboard trim tab assembly 18. The port trim tab assembly 16 and the starboard trim tab assembly 18 are each mounted on the transom 14 of the marine vessel 10 in a conventional manner. There is a control station 20 that supports a steering wheel 22 mounted on a helm 24, a control head 26, and a joystick 28. The control station 20 further includes a first display interface 30 and a second display interface 32. In this example, the first display interface 30 is a SIMRAD® display interface which displays navigational information and the second display interface 32 is an OPTIMUS® display which displays onboard system information. The control station 20 allows an operator to steer the outboard engine 12 and deploy and retract the port trim tab assembly 16 and the starboard trim tab assembly 18 in a generally conventional manner.

Figure 2:
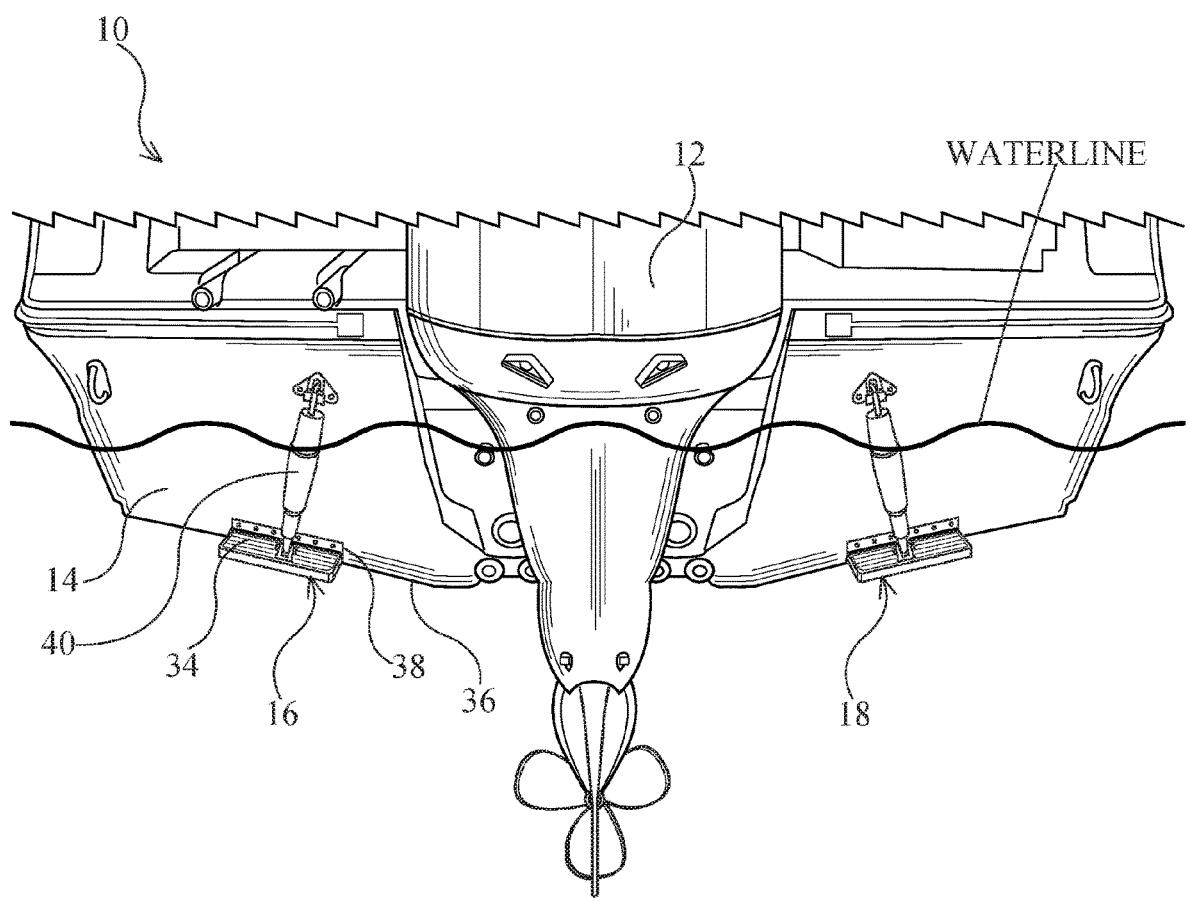
FIG. 2 is an end view of the marine vessel of FIG. 1 showing the trim tab assemblies mounted on a transom thereof.
Figure 4:
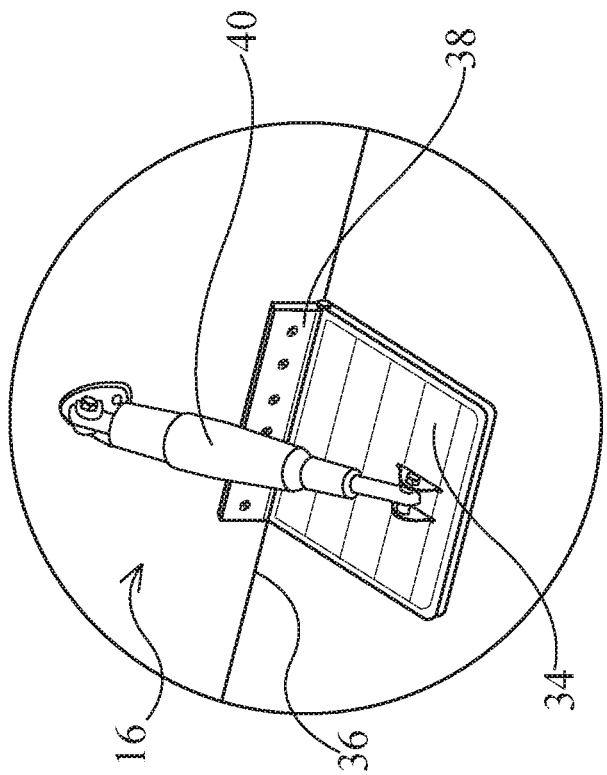
FIG. 4 is an enlarged view of the port trim tab assembly of the marine vessel of FIG. 1 shown in a deployed configuration.
Figure 3:
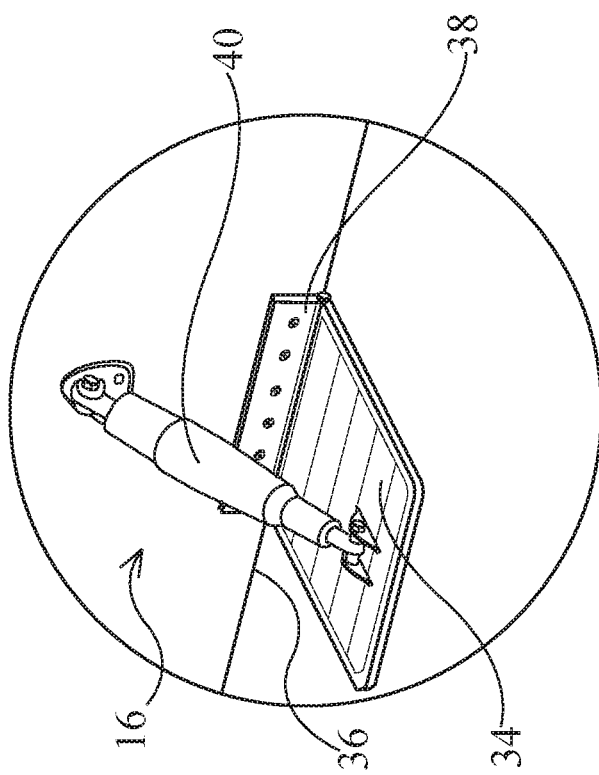
FIG. 3 is an enlarged view of a port trim tab assembly of the marine vessel of FIG. 1 shown in a retracted configuration.

The port trim tab assembly 16 and the starboard trim tab assembly 18 are shown in greater detail in FIG. 2. The port trim tab assembly 16 and the starboard trim tab assembly 18 are substantially the same in structure and function. Accordingly, only the port trim tab assembly 16 is described in detail herein with the understanding that the starboard trim tab assembly 18 has substantially the same structure and function in substantially the same manner. The port trim tab assembly 16 includes a trim tab 34 which is hingedly mounted adjacent a bottom edge 36 of the transom 14 of the marine vessel 10 by a hinge 38. The port trim tab assembly 16 also includes an actuator 40 which actuates the trim tab 34 between a retracted position, as shown in FIG. 3, and a deployed position, as shown in FIG. 4. Referring back to FIG. 2, the actuator 40 may be partially or fully below the waterline and is watertight.

Figure 6:
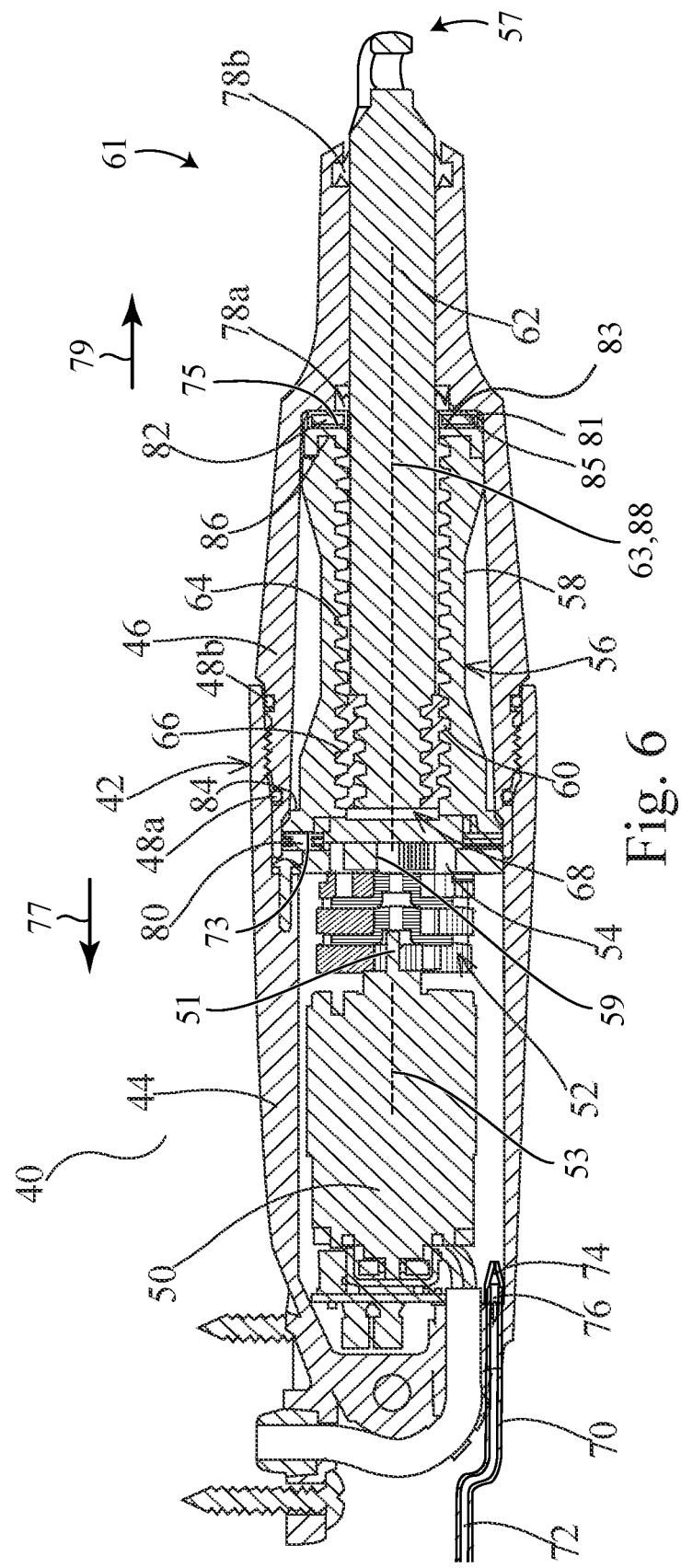
FIG. 6 is a sectional view of the actuator employed to retract and deploy the port trim tab as shown in FIGS. 3 and 4, with the actuator in a retracted position.
Figure 7:
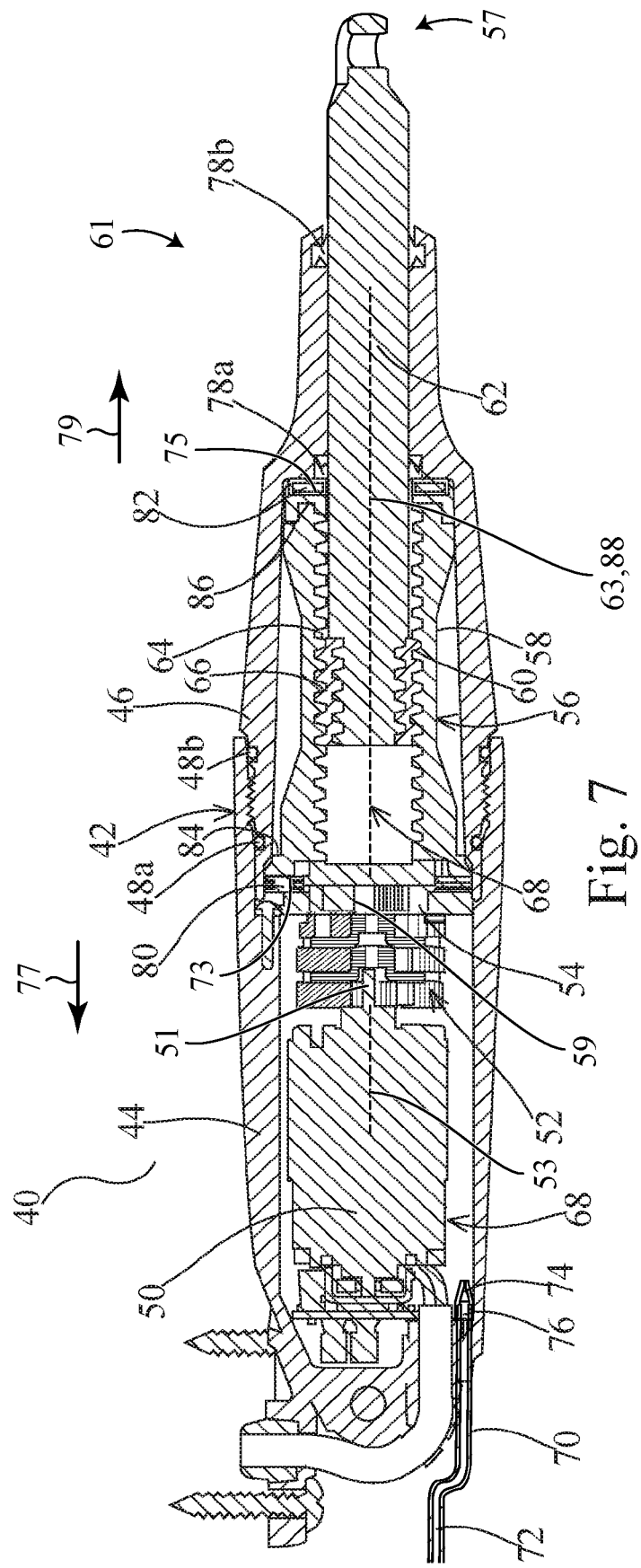
FIG. 7 is a sectional view of the actuator employed to retract and deploy the port trim tab as shown in FIGS. 3 and 4, with the actuator in an extended position.

The actuator 40 may be an electric actuator and is shown in greater detail in FIGS. 5 and 6. The actuator 40 generally includes a housing 42 which, in this example, has a first portion 44 and a second portion 46. The first portion 44 of the housing 42 and the second portion 46 of the housing 42 are threadedly connected and there are O-rings 48a and 48b which seal the first portion 44 of the housing 42 and the second portion 46 of the housing 42.

There is a motor 50 disposed in the housing 42. The motor 50 may be electric, for example, and includes a motor shaft 51. The motor 50 may apply a torque directly to the motor shaft 51. For example, the motor 50 may apply a torque to the motor shaft 51 independently of any gears, chains, or belts, and magnetic fields in the motor 50 may directly rotate the motor shaft 51. The motor 50 may apply a torque to the motor shaft 51 around a motor-shaft axis of rotation 53.

The motor shaft 51 is coupled (and thus the motor 50 is coupled) to a planetary gear reduction 52 which includes a last stage planetary gear 54. The last stage planetary gear 54 is coupled to a drive tube assembly 56 which includes a drive tube (or, more generally, a drive body) 58 and a piston nut 60 coupled to an output shaft 62.

The drive tube 58 has a torque-transfer surface 59 engaged with the last stage planetary gear 54. Rotation of the motor shaft 51 relative to the housing 42 and around the motor-shaft axis of rotation 53 causes rotation of the drive tube 58 relative to the housing 42 and around a drive-body axis of rotation 63. The torque-transfer surface 59 is therefore configured to receive a torque around the drive-body axis of rotation 63 to rotate the drive tube 58 relative to the housing 42 and around the drive-body axis of rotation 63.

The output shaft 62 has a distal end shown generally at 57 and positionable outside of the housing 42. A portion shown generally at 61 of the housing 42 contacts the output shaft 62 and supports the output shaft 62 radially relative to the drive-body axis of rotation 63 beyond the drive tube 58 in a direction along the drive-body axis of rotation 63 and towards the distal end 57 of the output shaft 62.

The drive tube 58 has internal threads 64 and the piston nut 60 has external threads 66. A threaded surface of the drive tube 58 defines the internal threads 64, and a threaded surface of the piston nut 60 defines the external threads 66. The internal threads 64 of the drive tube 58 and the external threads 66 of the piston nut 60 are threadedly engaged. Rotation of drive tube 58 accordingly causes the piston nut 60 to reciprocate along a length of the drive tube 58 and the output shaft 62 to reciprocate relative to the housing 42, so that the drive tube 58 may function as a drive body, and one or both of the piston nut 60 and the output shaft 62 may function as a drivable body that is drivable by rotation of the drive tube 58 to cause the output shaft 62 to reciprocate relative to the housing 42. The internal threads 64 of the drive tube 58 and the external threads 66 of the piston nut 60 may be larger in diameter than threads that threadedly engage the piston nut 60 and the output shaft 62. This results in increased thread load carrying capacity.

The diameter of the output shaft 62 may also be decreased to the inner diameter of the drive tube 58. A decreased diameter of the output shaft 62 means a decreased change in an internal volume 68 of the actuator 40 when the output shaft 62 reciprocates relative to the housing 42. The internal volume 68 of the housing 42 increases when the output shaft 62 is extended from the housing 42. The increase in the internal volume 68 of the housing 42 results in a negative air pressure in the housing 42 which is compensated by air flowing into the housing 42 through a vent conduit 70. The vent conduit 70 has a first end 72 in fluid communication with the atmosphere and a second end 74 in fluid communication with the internal volume 68 of the housing 42. There is a check valve 76 disposed at the second end 74 of the vent conduit 70. Air can accordingly flow through the vent conduit 70 into the housing 42 but not out of the housing 42. A positive air pressure is thereby created in the housing 42 when the output shaft 62 is extended and retracted into the housing 42. This restricts the ingress of water into the housing 42. There are also seals 78a and 78b which seal the output shaft 62 against the housing 42 which also restricts the ingress of water into the housing 42. A decreased diameter of the output shaft 62 facilitates sealing.

The drive tube 58 has first and second thrust-transfer surfaces 73 and 75. The first and second thrust-transfer surfaces 73 and 75 extend transversely to the drive-body axis of rotation 63. In the embodiment shown, the first and second thrust-transfer surfaces 73 and 75 extend perpendicularly to the drive-body axis of rotation 63, but alternative embodiments may differ. The first thrust-transfer surface 73 faces a first direction 77 along the drive-body axis of rotation 63. The second thrust-transfer surface 75 faces a second direction 79 along the drive-body axis of rotation 63. The second direction 79 is opposite the first direction 77, and the first and second thrust-transfer surfaces 73 and 75 face away from each other. Also, the first and second thrust-transfer surfaces 73 and 75 are at opposite ends of the drive tube 58. However, alternative embodiments may differ.

The actuator 40 also includes axial bearings 80 and 82 as well as radial bearings 84 and 86 which transfer axial loads and radial loads from the drive tube 58 to the housing 42. This allows for proper load transfer in both the push direction and pull direction. The axial bearing 82 includes rolling elements 81 between bearing surfaces 83 and 85. The axial bearings 80 and 82 may be axial-only bearings.

The axial bearing 80 faces the first thrust-transfer surface 73. The first thrust-transfer surface 73 may be positioned (either permanently or in response to a force on the drive tube 58 in the first direction 77) against the axial bearing 80. Thrust forces on the output shaft 62 in the first direction 77 may be transferred from at least the output shaft 62 to the piston nut 60, from at least the piston nut 60 to the drive tube 58, from at least the first thrust-transfer surface 73 of the drive tube 58 to the axial bearing 80, and from at least the axial bearing 80 to the housing 42. Therefore, the axial bearing 80 is configured to transfer, to the housing 42, thrust forces from the output shaft 62 in the first direction 77.

The axial bearing 82 faces the second thrust-transfer surface 75. The second thrust-transfer surface 75 may be positioned (either permanently or in response to a force on the drive tube 58 in the second direction 79) against the axial bearing 82. Thrust forces on the output shaft 62 in the second direction 79 may be transferred from at least the output shaft 62 to the piston nut 60, from at least the piston nut 60 to the drive tube 58, from at least the second thrust-transfer surface 75 of the drive tube 58 to the axial bearing 82, and from at least the axial bearing 82 to the housing 42. Therefore, the axial bearing 82 is configured to transfer, to the housing 42, thrust forces from the output shaft 62 in the second direction 79.

The axial bearings 80 and 82 extend, in a radial dimension from the drive-body axis of rotation 63, beyond the torque-transfer surface 59, the planetary gear reduction 52, and the motor 50. Further, the motor-shaft axis of rotation 53 is colinear with a line 88 within the bearings 80 and 82, and the motor-shaft axis of rotation 53 and the drive-body axis of rotation 63 are coaxial. However, alternative embodiments may differ. For example, in some embodiments, one or both of the axial bearings 80 and 82 may extend, in a radial dimension from the drive-body axis of rotation 63, beyond none, one, more than one, or all of the torque-transfer surface 59, the planetary gear reduction 52, and the motor 50. Further, the motor-shaft axis of rotation 53 may differ in other embodiments.

The actuator 42 is devoid of bearing surfaces that are radially opposed relative to the drive-body axis of rotation 63, that contact any rolling elements of the actuator 42, and that are positioned to support, directly, the drive tube 58, the piston nut 60, or the output shaft 62.

It is desirable to also have proper load transfer in the pull direction because trim tabs are often employed as steps to get in to and out of marine vessels. It is also desirable to have proper load transfer in both the push direction and pull direction if an actuator is being employed in a wake gate assembly in which the actuator needs to be loaded in both the push direction and the pull direction.

Figure 8:
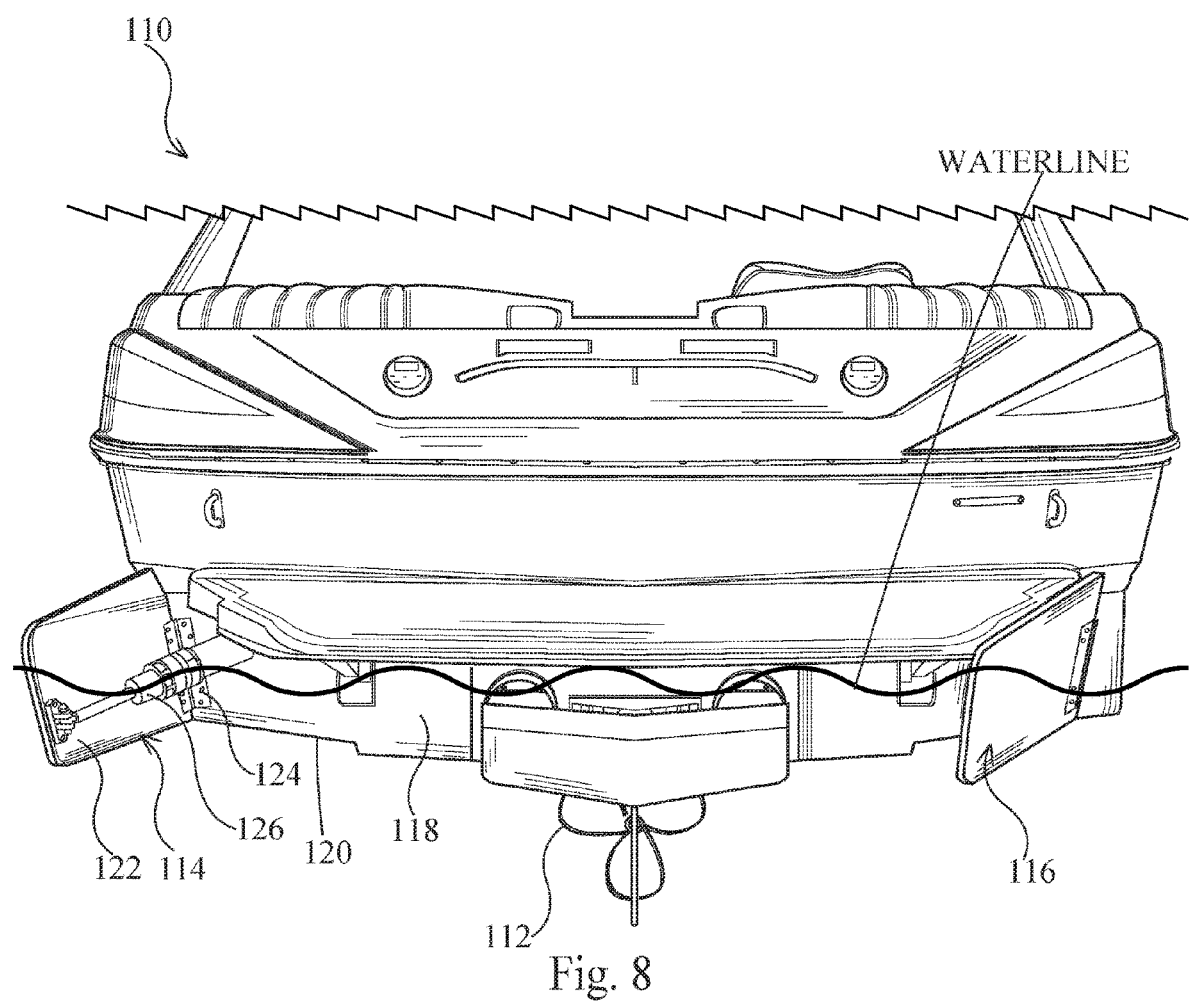
FIG. 8 is an end view of a marine vessel according to another embodiment, showing wake gate assemblies mounted on a transom thereof.

FIG. 8 shows a marine vessel 110 according to another embodiment and provided with a propulsion unit which, in this example, is in the form of an inboard engine 112. However, the marine vessel may be provided with any number or form of propulsion units in other examples. The marine vessel 110 is also provided with a port wake gate assembly 114 and a starboard wake gate assembly 116. The port wake gate assembly 114 and the starboard wake gate assembly 116 are each mounted on a transom 118 of the marine vessel 110 in a conventional manner.

The port wake gate assembly 114 and the starboard wake gate assembly 116 are substantially the same in structure and function. Accordingly, only the port wake gate assembly 114 is described in detail herein with the understanding that the starboard wake gate assembly 116 has substantially the same structure and functions in substantially the same manner. The port wake gate assembly 114 includes a wake tab 122 which is hingedly mounted adjacent a bottom edge 120 of the transom 118 of the marine vessel 110 by a hinge 124. The port wake gate assembly 114 also includes an actuator 126 which actuates the wake tab 122 between a retracted position, as shown in FIG. 9, and a deployed position, as shown in FIG. 10. Referring back to FIG. 8, the actuator 126 may be partially or fully below the waterline and is watertight.

Figure 11:
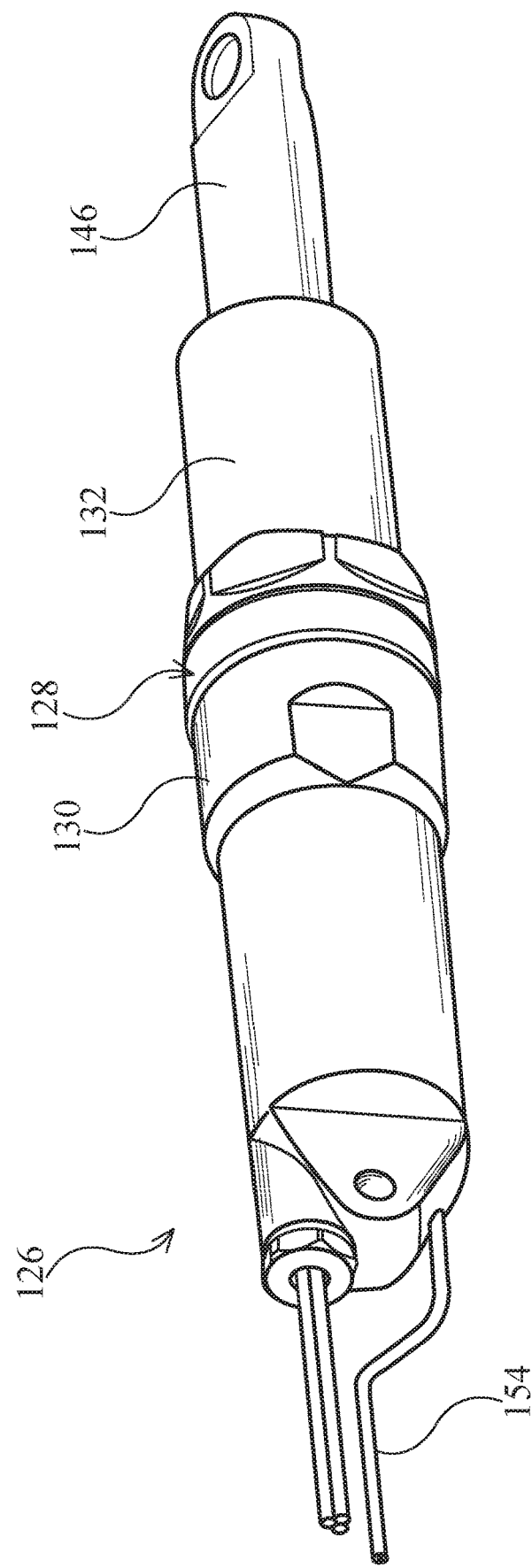
FIG. 11 is a perspective view of an actuator employed to retract and deploy the port wake gate assembly as shown in FIGS. 9 and 10.
Figure 12:
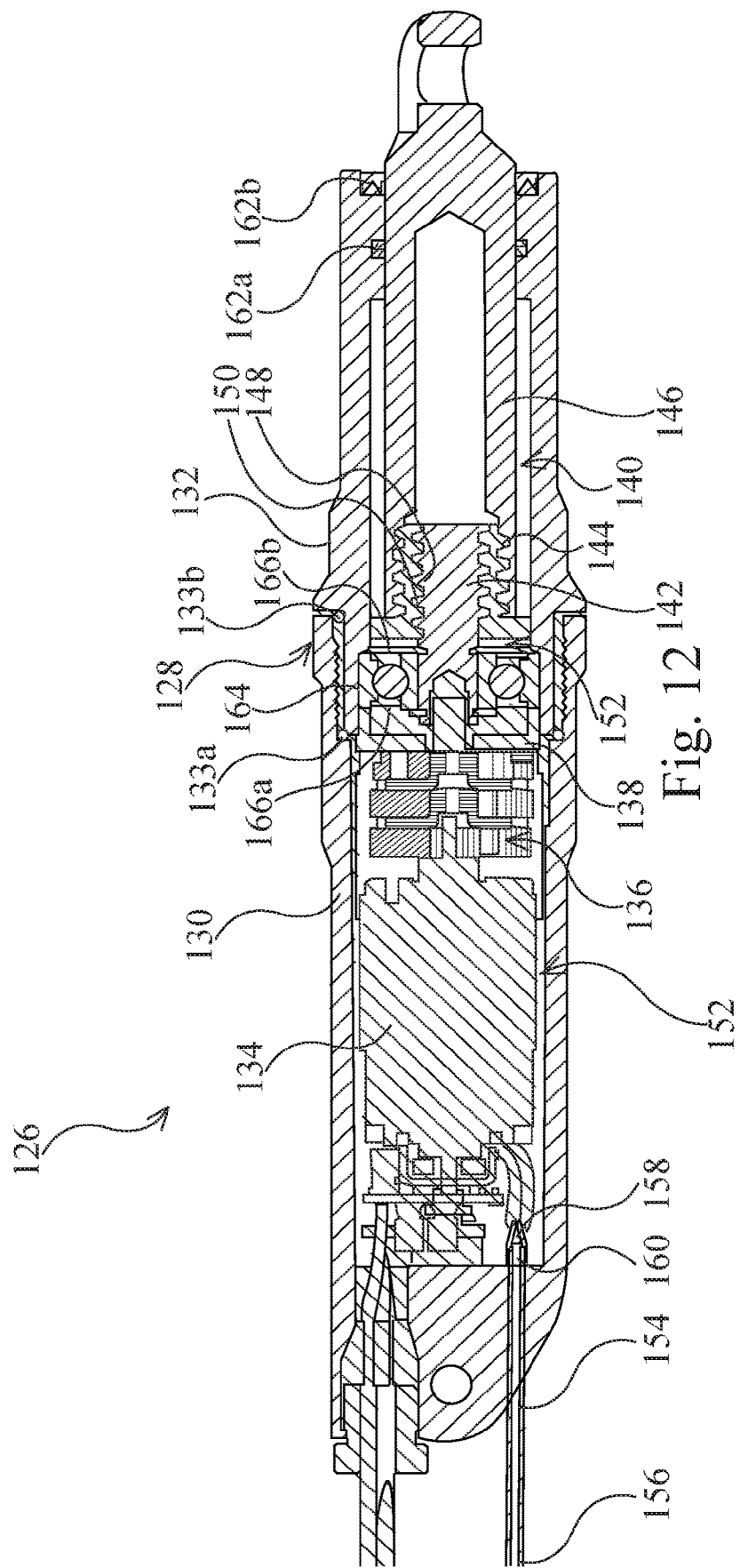
FIG. 12 is a sectional view of the actuator employed to retract and deploy the port wake gate assembly as shown in FIGS. 9 and 10, with the actuator in a retracted position.
Figure 13:
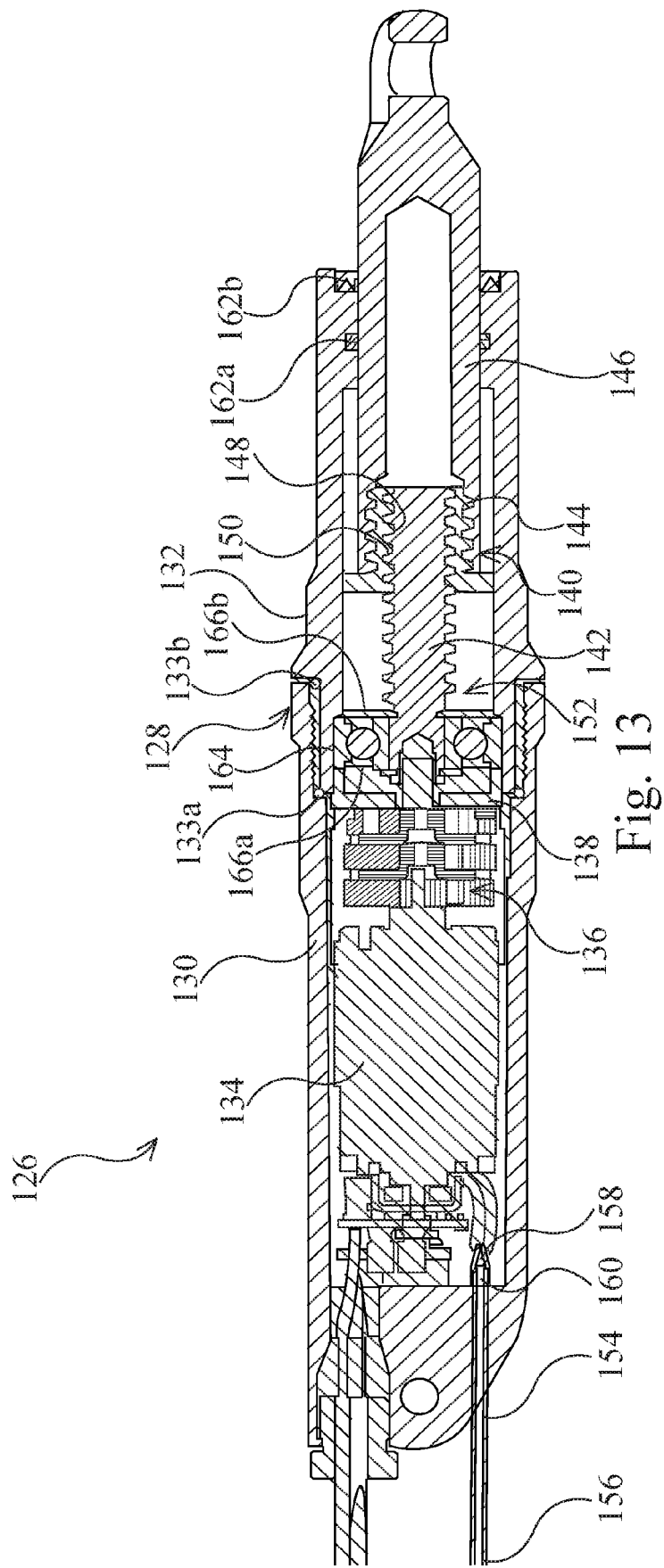
FIG. 13 is a sectional view of the actuator employed to retract and deploy the port wake gate assembly as shown in FIGS. 9 and 10, with the actuator in an extended position.

The actuator 126 may be an electric actuator and is shown in greater detail in FIGS. 11 and 12. The actuator 126 generally includes a housing 128 which, in this example, has a first portion 130 and a second portion 132. The first portion 130 of the housing 128 and the second portion 132 of the housing 128 are threadedly connected and there are O-rings 133a and 133b which seal the first portion 130 of the housing 128 and the second portion 132 of the housing 128. There is a motor 134 disposed in the housing 128. The motor 134 is coupled to a planetary gear reduction 136 which includes a last stage planetary gear 138. The last stage planetary gear 138 is coupled to a drive shaft assembly 140 which includes a drive shaft 142 and a piston nut 144 coupled to an output shaft 146. The drive shaft 142 has external threads 148 and the piston nut 144 has internal threads 150. The external threads 148 of the drive shaft 142 and the internal threads 150 of the piston nut 144 are threadedly engaged. The motor 134 rotates the drive shaft 142. Rotation of drive shaft 142 accordingly causes the piston nut 144 to reciprocate along a length of the drive shaft 142 and the output shaft 146 to reciprocate relative to the housing 128. The external threads 148 of the drive shaft 142 and the internal threads 150 of the piston nut 144 may be smaller in diameter than threads that threadedly engage the piston nut 144 and the output shaft 146. This results in increased thread load carrying capacity.

An internal volume 152 of the housing 128 increases when the output shaft 146 is extended from the housing 128. The increase in the internal volume 152 of the housing 128 results in a negative air pressure in the housing 128 which is compensated by air flowing into the housing 128 through a vent conduit 154. The vent conduit 154 has first end 156 in fluid communication with the atmosphere and a second end 158 in fluid communication with the internal volume 152 of the housing 128. There is a check valve 160 disposed at the second end 158 of the vent conduit 154. Air can accordingly flow through the vent conduit 154 into the housing 128 but not out of the housing 128. A positive air pressure is thereby created in the housing 128 when the output shaft 146 is extended and retracted into the housing 128. This restricts the ingress of water into the housing 128. There are also seals 162a and 162b which seal the output shaft 146 against the housing 128 which also restricts the ingress of water into the housing 128. A decreased diameter of the output shaft 146 facilitates sealing.

The actuator 126 also includes bearings 164 which transfer axial loads and radial loads from the drive shaft 142 to the housing 128. The bearings 164 are retained by circlips 166a and 166b in this example. This allows for proper load transfer in both the push direction and pull direction.

It will be understood by a person skilled in the art that the actuator of the trim tab assembly disclosed herein may be employed as part of a wake gate assembly. Likewise, the actuator of the wake gate assembly disclosed herein may be employed as part of a trim tab assembly.

Figure 14:
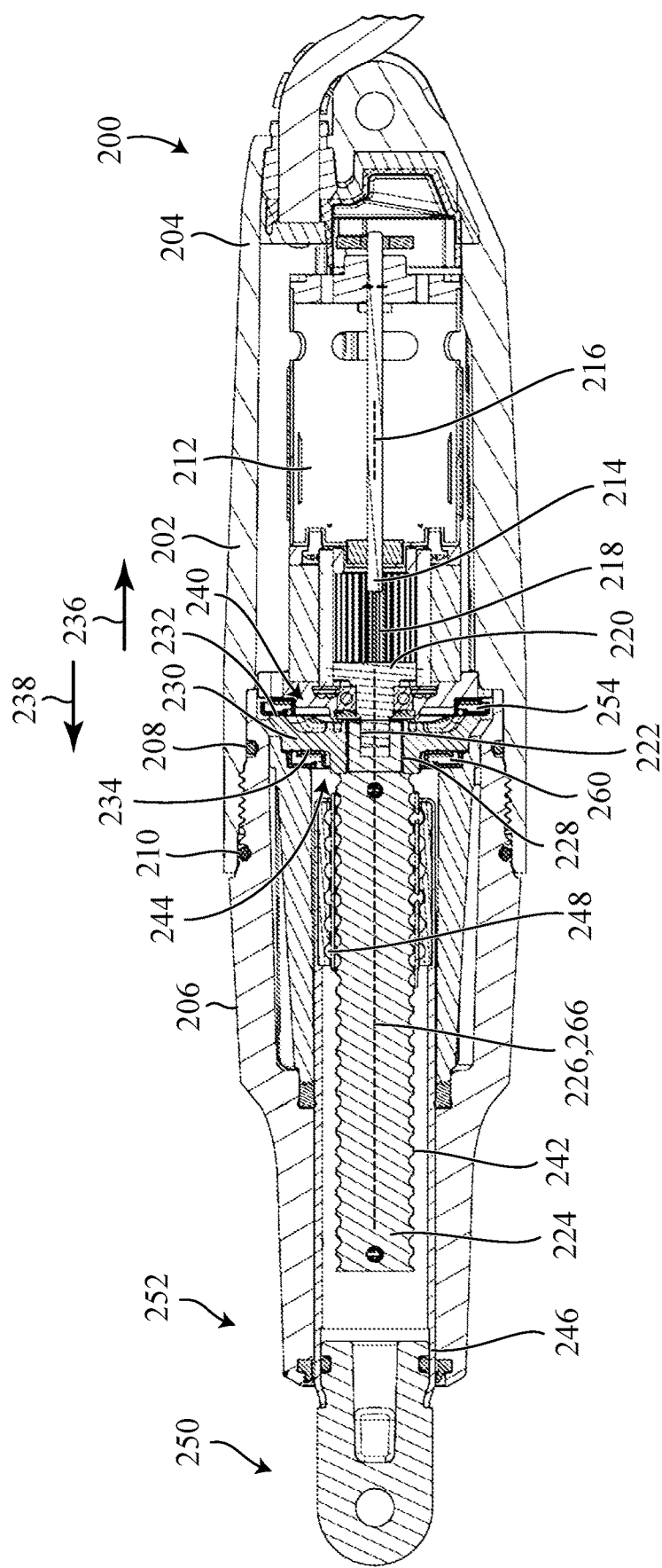
FIG. 14 is a sectional view of an actuator according to another embodiment.
Figure 15:
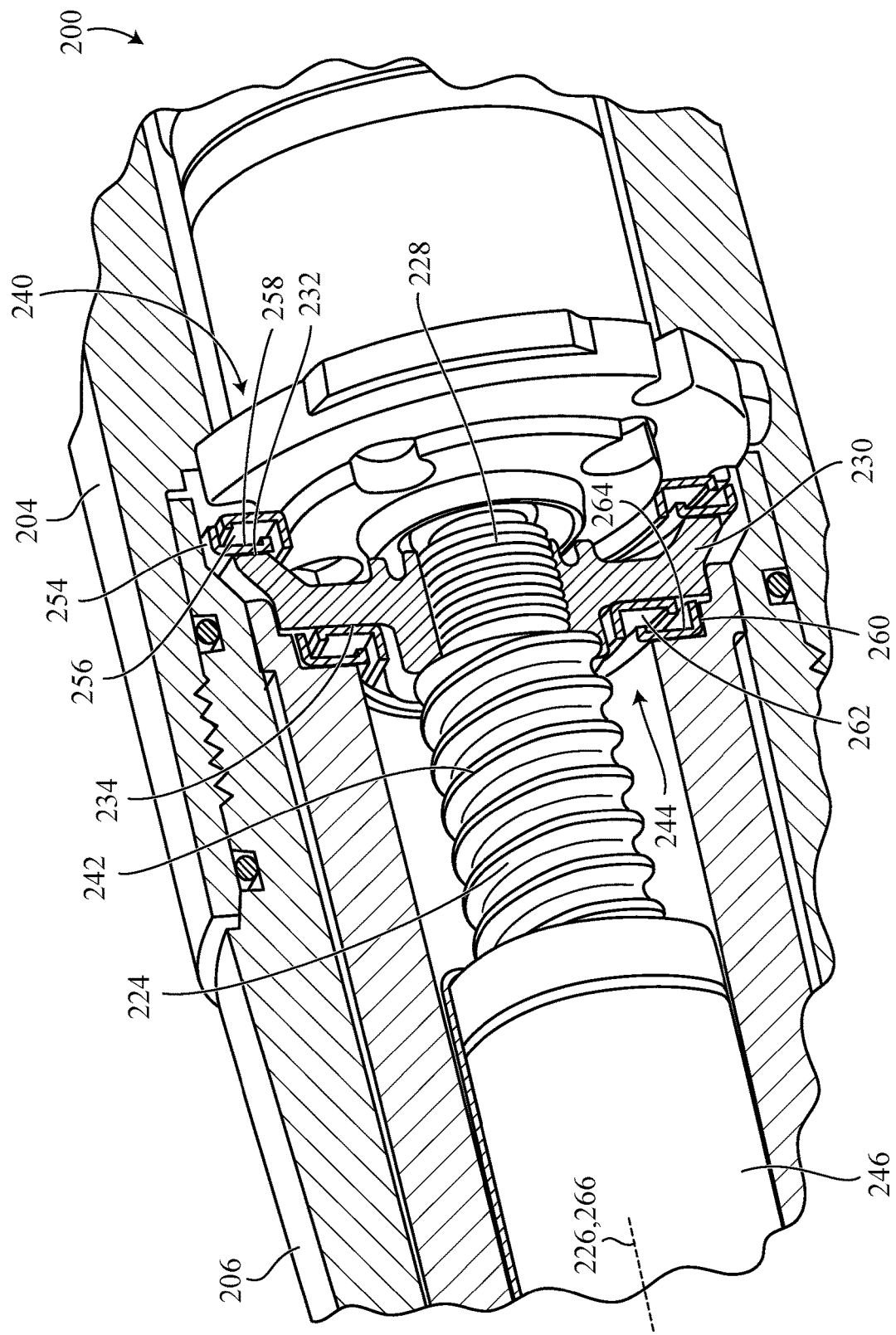
FIG. 15 is an enlarged sectional view of the actuator of FIG. 14.

FIGS. 14 and 15 show an actuator shown generally at 200 according to another embodiment. The actuator 200 may be employed as part of a wake gate assembly or as part of a trim tab assembly such as those described above, for example.

The actuator 200 may be an electric actuator and generally includes a housing 202 which, in this example, has a first portion 204 and a second portion 206. The first portion 204 of the housing 202 and the second portion 206 of the housing 202 are threadedly connected and there are O-rings 208 and 210 which seal the first portion 204 of the housing 202 and the second portion 206 of the housing 202.

There is a motor 212 disposed in the housing 202. The motor 202 may be electric, for example, and includes a motor shaft 214. The motor 212 may apply a torque directly to the motor shaft 214. For example, the motor 212 may apply a torque to the motor shaft 214 independently of any gears, chains, or belts, and magnetic fields in the motor 212 may directly rotate the motor shaft 214. The motor 212 may apply a torque to the motor shaft 214 around a motor-shaft axis of rotation 216.

The motor shaft 214 is coupled (and thus the motor 212 is coupled) to one or more gears 218. One of the one or more gears 218 is coupled to a coupling body 220, which is coupled to a torque-transfer surface 222 of a threaded shaft 224. In the embodiment shown, the coupling body 220 defines external threads that are threadedly engaged with internal threads of the torque-transfer surface 222, such that rotation of the motor shaft 214 around the motor-shaft axis of rotation 216 causes rotation of the one or more gears 218, which causes rotation of the coupling body 220, which causes rotation of the threaded shaft 224 around a drive-body axis of rotation 226. The torque-transfer surface 222 is therefore configured to receive a torque around the drive-body axis of rotation 226 to rotate the threaded shaft 224 relative to the housing 202 and around the drive-body axis of rotation 226.

The threaded shaft 224 also defines external threads 228, and at least a portion of the external threads 228 surround at least a portion of the internal threads of the torque-transfer surface 222. A thrust-transfer body 230 defines internal threads that threadedly engage the external threads 228. The thrust-transfer body 230 is thus coupled to the threaded shaft 224 such that axial thrust forces along the drive-body axis of rotation 226 may be transferred from the threaded shaft 224 to the thrust-transfer body 230. Further, the threaded shaft 224 and the thrust-transfer body 230 may collectively function as a drive body. However, in alternative embodiments, the thrust-transfer body 230 may be coupled to the threaded shaft 224 in other ways, or the threaded shaft 224 and the thrust-transfer body 230 may be integrally formed.

The thrust-transfer body 230 has first and second thrust-transfer surfaces 232 and 234. The first and second thrust-transfer surfaces 232 and 234 extend transversely to the drive-body axis of rotation 226. In the embodiment shown, the first and second thrust-transfer surfaces 232 and 234 extend perpendicularly to the drive-body axis of rotation 226, but alternative embodiments may differ. The first thrust-transfer surface 232 faces a first direction 236 along the drive-body axis of rotation 226. The second thrust-transfer surface 234 faces a second direction 238 along the drive-body axis of rotation 226. The second direction 238 is opposite the first direction 236, and the first and second thrust-transfer surfaces 232 and 234 face away from each other. However, alternative embodiments may differ.

The motor 212 is on a first side shown generally at 240 of the thrust-transfer body 230. The threaded shaft 224 has a threaded surface 242 defining external threads, and the threaded surface 242 is entirely on a second side shown generally at 244 of the thrust-transfer body 230, and the second side 244 is opposite the first side 240.

The actuator 200 also includes an output shaft 246 having a threaded surface 248 defining internal threads that are threadedly engaged with the external threads defined by the threaded surface 242, and the housing 202 supports the output shaft 246 for movement relative to the housing 202 along the drive-body axis of rotation 226.

Rotation of threaded shaft 224 accordingly causes the output shaft 246 to reciprocate along a length of the threaded shaft 224, so that the threaded shaft 224 and the thrust-transfer body 230 may function as a drive body, and the output shaft 246 may function as a drivable body that is drivable by rotation of the threaded shaft 224 to cause the output shaft 246 to reciprocate relative to the housing 202.

The output shaft 246 has a distal end shown generally at 250 and positionable outside of the housing 202. A portion shown generally at 252 of the housing 202 contacts the output shaft 246 and supports the output shaft 246 radially relative to the drive-body axis of rotation 226 beyond the threaded shaft 224 in a direction along the drive-body axis of rotation 226 and towards the distal end 250 of the output shaft 246.

The actuator 200 also includes an axial bearing 254 facing the first thrust-transfer surface 232. The axial bearing 254 may include bearing surfaces 256 and 258 that are axially opposed in an axial direction along the drive-body axis of rotation 226, and the axial bearing 254 may include rolling elements between the bearing surfaces 256 and 258. The first thrust-transfer surface 232 may be positioned (either permanently or in response to a force on the threaded shaft 224 in the first direction 236) against the axial bearing 254. Thrust forces on the output shaft 246 in the first direction 236 may be transferred from at least the output shaft 246 to the threaded shaft 224, from at least the threaded shaft 224 to the thrust-transfer body 230, from at least the first thrust-transfer surface 232 of the thrust-transfer body 230 to the axial bearing 254, and from at least the axial bearing 254 to the housing 202. Therefore, the axial bearing 254 is configured to transfer, to the housing 202, thrust forces from the output shaft 246 in the first direction 236. The axial bearing 254 may be an axial-only bearing.

The actuator 200 also includes an axial bearing 260 facing the second thrust-transfer surface 234. The axial bearing 260 may include bearing surfaces 262 and 264 that are axially opposed in an axial direction along the drive-body axis of rotation 226, and the axial bearing 260 may include rolling elements between the bearing surfaces 262 and 264. The second thrust-transfer surface 234 may be positioned (either permanently or in response to a force on the threaded shaft 224 in the second direction 238) against the axial bearing 260. Thrust forces on the output shaft 246 in the second direction 238 may be transferred from at least the output shaft 246 to the threaded shaft 224, from at least the threaded shaft 224 to the thrust-transfer body 230, from at least the second thrust-transfer surface 234 of the thrust-transfer body 230 to the axial bearing 260, and from at least the axial bearing 260 to the housing 202. Therefore, the axial bearing 260 is configured to transfer, to the housing 202, thrust forces from the output shaft 246 in the second direction 238. The axial bearing 260 may be an axial-only bearing.

The axial bearings 254 and 260 extend, in a radial dimension from the drive-body axis of rotation 226, beyond the torque-transfer surface 222, the at least one gear 218, and the motor 212. Further, the motor-shaft axis of rotation 216 is colinear with a line 266 within the bearings 254 and 260, and the motor-shaft axis of rotation 216 and the drive-body axis of rotation 226 are coaxial. However, alternative embodiments may differ. For example, in some embodiments, one or both of the axial bearings 254 and 260 may extend, in a radial dimension from the drive-body axis of rotation 226, beyond none, one, more than one, or all of the torque-transfer surface 222, the at least one gear 218, and the motor 212. Further, the motor-shaft axis of rotation 216 may differ in other embodiments.

The actuator 200 is devoid of bearing surfaces that are radially opposed relative to the drive-body axis of rotation 226, that contact any rolling elements of the actuator 200, and that are positioned to support, directly, the threaded shaft 224, the thrust-transfer body 230, or the output shaft 246.

In general, in embodiments such as those described above, axial bearings (such as the bearings 80, 82, 256, and 260) may be an effective and efficient means of transferring loads of rotating members to a housing (such as the housing 42 or 202). Further, in embodiments such as those described above, use of a housing (such as the housing 42 or 202) to support an output shaft (such as the output shaft 62 or 246) radially relative to a drive-body axis of rotation may reduce a number of parts of an actuator, which may result in a simpler design over one with dedicated radial bearings.

It will be understood by a person skilled in the art that many of the details provided above are by way of example only, and are not intended to limit the scope of the invention which is to be determined with reference to the following claims.

The invention claimed is:

1. An actuator comprising:
   a housing;
   a drive body rotatably coupled to the housing such that the drive body is rotatable relative to the housing around a drive-body axis of rotation, the drive body comprising:

a threaded surface;

a first thrust-transfer surface extending transversely to the drive-body axis of rotation and facing a first direction along the drive-body axis of rotation;

a second thrust-transfer surface extending transversely to the drive-body axis of rotation and facing a second direction, opposite the first direction, along the drive-body axis of rotation; and a torque-transfer surface configured to receive a torque around the drive-body axis of rotation to rotate the drive body relative to the housing and around the drive-body axis of rotation;

a drivable body comprising an output shaft and a threaded surface, the threaded surface of the drivable body threadedly engaged with the threaded surface of the drive body such that rotation of the drive body relative to the housing and around the drive-body axis of rotation causes movement of the output shaft relative to the housing and along the drive-body axis of rotation;

a first bearing facing the first thrust-transfer surface and configured to transfer, to the housing, thrust forces from the output shaft in the first direction; and a second bearing facing the second thrust-transfer surface and configured to transfer, to the housing, thrust forces from the output shaft in the second direction;

wherein at least the first bearing extends, in a radial dimension from the drive-body axis of rotation, beyond the torque-transfer surface.

2. The actuator of claim 1 wherein the second bearing extends, in the radial dimension from the drive-body axis of rotation, beyond the torque-transfer surface.

3. The actuator of claim 1 wherein the drive body is a drive tube, the threaded surface of the drive body is on an interior side of the drive tube, and the threaded surface of the drivable body is on an exterior side of the drivable body.

4. The actuator of claim 3 wherein the first and second thrust-transfer surfaces are at opposite ends of the drive tube.

5. The actuator of claim 3 wherein the drivable body comprises a piston nut coupled to the output shaft, the piston nut having the threaded surface of the drivable body.

6. The actuator of claim 1 wherein the drive body is a drive shaft, the threaded surface of the drive body is on an exterior side of the drive shaft, and the threaded surface of the drivable body is on an exterior side of the drivable body.

7. The actuator of claim 1 wherein a portion of the housing contacts the output shaft and supports the output shaft radially relative to the drive-body axis of rotation beyond the drive body in a direction along the drive-body axis of rotation and towards a distal end of the output shaft that is positionable outside of the housing.

8. The actuator of claim 1 further comprising a motor comprising a motor shaft rotatable relative to the housing around a motor-shaft axis of rotation, wherein the motor is configured to apply a torque directly to the motor shaft and around the motor-shaft axis of rotation, and the motor shaft is coupled to the torque-transfer surface such that rotation of the motor shaft relative to the housing and around the motor-shaft axis of rotation causes rotation of the drive body relative to the housing and around the drive-body axis of rotation.

9. The actuator of claim 8 wherein the motor-shaft axis of rotation is colinear with a line within the first and second bearings.

10. The actuator of claim 8 wherein the drive-body axis of rotation and the motor-shaft axis of rotation are coaxial.

11. The actuator of claim 8 wherein the drive body further comprises a thrust-transfer body comprising the first and second thrust-transfer surfaces, the motor is on a first side of the thrust-transfer body, and the threaded surface of the drive body is entirely on a second side of the thrust-transfer body opposite the first side of the thrust-transfer body.

12. The actuator of claim 8 further comprising at least one gear coupling the motor shaft to the torque-transfer surface.

13. The actuator of claim 12 wherein at least the first bearing extends, in the radial dimension from the drive-body axis of rotation, beyond the motor and beyond the at least one gear.

14. The actuator of claim 1 wherein the drive body further comprises a thrust-transfer body comprising the first and second thrust-transfer surfaces, and the threaded surface of the drive body is entirely on a first side of the thrust-transfer body.

15. The actuator of claim 14 wherein the drive body further comprises a threaded shaft having the threaded surface of the drivable body, and the thrust-transfer body is threadedly coupled to the threaded shaft.

16. The actuator of claim 1 wherein the first bearing is an axial-only bearing, and the second bearing is an axial-only bearing.

17. The actuator of claim 1 wherein the actuator is devoid of bearing surfaces that are radially opposed relative to the drive-body axis of rotation, that contact any rolling elements of the actuator, and that are positioned to support, directly, the drive body or the drivable body.

18. The actuator of claim 1 wherein the first and second thrust-transfer surfaces face away from each other.

19. A marine vessel comprising:

a transom;

a tab hingedly mounted to the transom; and the actuator of claim 1 mounted to the transom and to the tab such that actuation of the actuator actuates the tab between retracted and deployed positions relative to the transom.

20. The marine vessel of claim 19 wherein the tab is part of a trim tab assembly or a wake gate assembly.

* * * * *